United States Patent [19]
Paskert

[11] 3,972,498
[45] Aug. 3, 1976

[54] DEVICE FOR ATTACHING ELECTRICAL BOXES TO METAL STUDS

[75] Inventor: Joseph Henry Paskert, Lakewood, Ohio

[73] Assignee: Eaton Corporation, Cleveland, Ohio

[22] Filed: July 30, 1975

[21] Appl. No.: 600,243

[52] U.S. Cl. .............................. 248/205 R; 174/58; 220/3.9; 248/228
[51] Int. Cl.² ..................... H02G 3/12; H02G 3/08; E06B 7/28
[58] Field of Search ................ 248/205 R, 228, 229, 248/DIG. 6; 174/51, 58; 220/3.9

[56] References Cited
UNITED STATES PATENTS

| 1,930,242 | 10/1933 | Lademann | 248/DIG. 6 |
| 2,644,600 | 7/1953 | Senif | 220/3.9 |
| 3,474,994 | 10/1969 | Swanquist | 220/3.9 X |
| 3,491,974 | 1/1970 | Swanquist | 220/3.9 X |
| 3,588,019 | 6/1971 | Cozeck | 248/228 |
| 3,767,151 | 10/1973 | Seal | 174/58 |
| 3,804,359 | 4/1974 | Cumber | 248/205 R |

Primary Examiner—J. Franklin Foss
Attorney, Agent, or Firm—Teagno & Toddy

[57] ABSTRACT

A mounting device for outlet boxes has a gripping member which attaches to the flanges of a metal stud. A clamp joins an electrical box to the gripping member. The clamp adjusts along the longitudinal axis of the gripping member to allow placement of the electrical box with respect to dry wall attached to the metal stud. The clamp is movable in one direction only with respect to the gripping member and is preferably moved until a stop on the gripping member is contacted to preset the mounting device for the particular placement of metal stud and thickness of dry wall utilized.

7 Claims, 5 Drawing Figures

U.S. Patent  Aug. 3, 1976  3,972,498
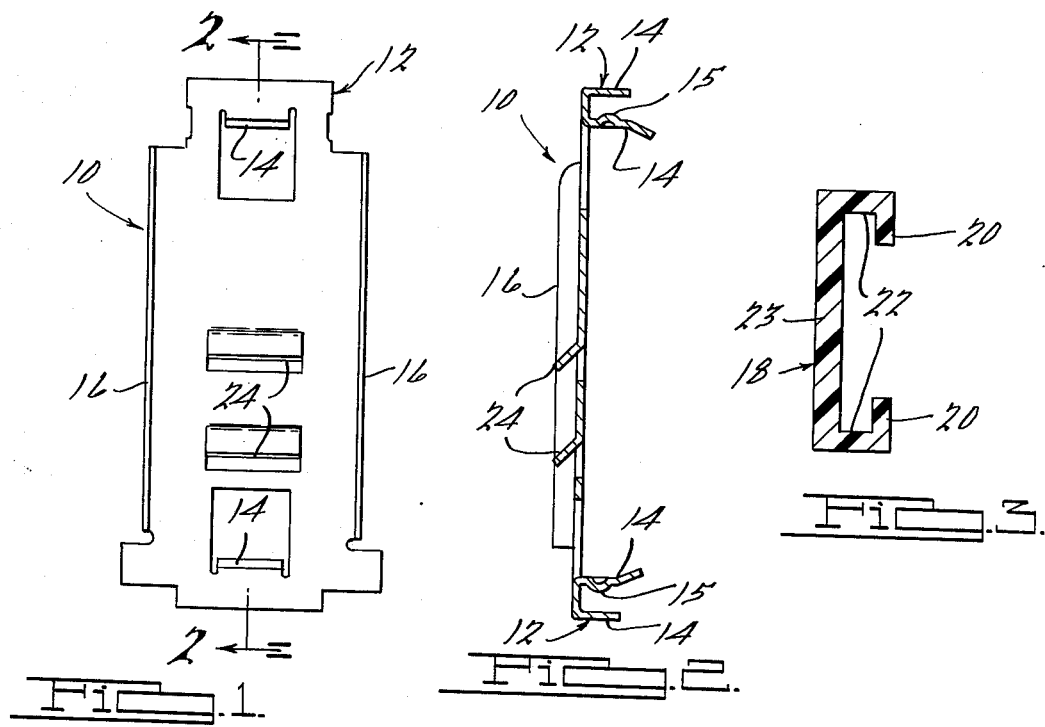
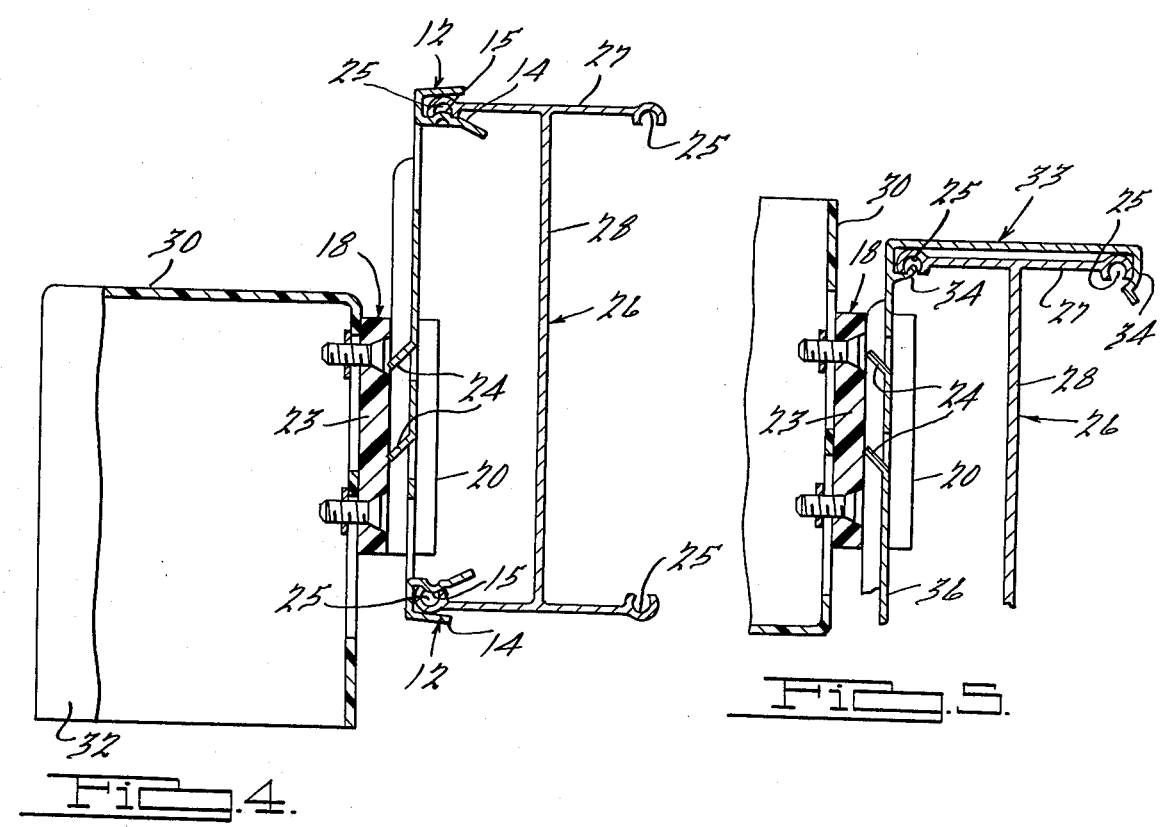

DEVICE FOR ATTACHING ELECTRICAL BOXES TO METAL STUDS

BACKGROUND OF THE INVENTION

1. Field Of The Invention

In one aspect, this invention relates to devices for attaching electrical boxes and the like to metal studs. In a further aspect this invention relates to devices for attaching electrical boxes and the like to metal studs, such as I beams and T beams having flanges with channels on the ends thereof, which allows the electrical box to be selectively positioned with respect to dry wall attached to the metal studs.

2. Description of the Prior Art

U.S. Pat. No. 3,491,947 discloses a channel shaped base member with slots at its end, the slots being adapted to receive the flanges of a metal stud. An electrical outlet box defining part suitable for attachment to an electrical outlet box includes a hooked end and a rocker arm end. The outlet box is slipped between the hooked end and the rocker end of the part the hooked end firmly holding the outlet box. The rocker arm engages the channel shaped base member and a flange of the metal stud to hold the outlet box in position.

U.S. Pat. No. 3,474,994 discloses mounting means where one portion of a clip is attached to the flange of metal studding by special grippers and a second portion of the clip is attached to an outlet box. The clip may be formed in two separate portions, a first portion for engaging the metal stud and a second hooked portion for engaging the box which is attached to the first portion.

Prior art clips provide suitable means for mounting electrical boxes to the flanged metal studs gaining favor in building construction. However, there are problems when using the prior art clips. Prior art clips are not adjustable in the direction perpendicular to the surface defined by sheets of dry wall or plaster board placed over the metal studs to form a wall. Because the face of the electrical outlet box should be flush with one surface of the dry wall, a different clip was required for each thickness of dry wall there being four standard thicknesses of dry wall normally used. Thus, people were required to stock four different size clips with the resulting problems of storage and the possible error of using the wrong size clip. Use of the wrong size clip would result in the surface of the electrical outlet box being improperly aligned with respect to the surface of the dry wall attached to the metal studs. Also, variations in the dry wall or studding may require some adjustment to insure the surface of the outlet box is at the desired position.

The prior art clips may also allow vertical motion of the clip and outlet box. Thus, the outlet box may shift vertically when the dry wall is placed on the metal studding resulting in an improperly positioned outlet box.

SUMMARY OF THE INVENTION

It is an object of this invention to provide a device for mounting electrical boxes to metal studding which is adjustable so as to be useful with various thicknesses of dry wall or which may be preset for use with a particular thickness of dry wall.

It is a further object of this invention to provide a device for mounting electrical outlet boxes to metal studs which minimizes vertical movement of the box once the outlet box is attached to the metal stud.

It is yet a further object of this invention to provide a mounting device which may allow a fine adjustment of the electrical box after the dry wall is positioned to adjust for variations in dry wall thickness.

It is a feature of this invention to form a mounting device for use in attaching an electrical box to a flanged beam with a clamp having hooks. The hooks engage a gripping member which is attached to a metal stud. The clamp can move longitudinally in one direction along the gripping member's sides and may be moved until a stop is contacted to preset the device for the thickness of dry wall to be utilized. This allows the clamp to be moved along the longitudinal axis of the gripping member. An electrical box is mounted on the clamp opposite the hooks. Thus, the clamp and box can be moved toward the dry wall's surface allowing the surface of the attached electrical box to be adjusted with respect to the surfaces of dry wall attached to the beam while resisting motion away from the dry wall's surface to provide a solid mounting for the box relative to the dry wall or the device may be preset by moving the clamp until a stop is contacted.

Many of the flanged metal beams used as studs have a channel or channels formed on one surface of the flange ends. AS a further feature of this invention a detent is formed on the gripping means. The detent is positioned so as to engage the channel. The detent prevents or inhibits motion of the gripping member, clamp and the outlet box along the metal stud. Thus, the gripping member, clamp and outlet box can be positioned on the stud before the dry wall is installed and the outlet box will be held firmly in the proper position while the dry wall is installed.

BRIEF DESCRIPTION OF THE DRAWINGS

In the accompanying drawing:

FIG. 1 is a top view of one embodiment of a gripping member which grips two flanges of a metal stud;

FIG. 2 is a sectional view of FIG. 1 taken along the line 2—2;

FIG. 3 is a sectional view of a clamp for use with the gripping member of FIG. 1;

FIG. 4 is a top view in partial section of the gripping member and clamp holding an electrical outlet box to a metal I-beam; and FIG. 5 is a top view in partial section of a different gripping member for attaching an outlet box to an I-beam.

DETAILED DESCRIPTION OF THE PREFERRED EMBODIMENTS

In the drawing FIGS. 1 and 2 show a gripping member 10 suitable for use in this invention. The gripping member 10 has gripping means 12 located at each end of the gripping member and adapted so that they can be slipped over flanges of a metal stud. As shown, in FIG. 4 the gripping means 12 is adapted to grip those flanges 28 which are on the same side of a web 27 which connects the flanges 28. The gripping means 12 have a detent 15 which protrudes into the space between fingers 14 which cooperate to form the gripping means. THe detent 15 provides a positive locking action when the gripping member is placed on the metal stud.

As shown, the gripping member 10 has generally parallel sides 16 providing a flat track surface suitable for receiving a clamp 18 shown in cross section in FIG.

3. The clamp 18 is placed around the gripping member 12 so that hooked ends 20 of the clamp engage the side 16 of the gripping member and the flat interior surfaces 22 of the clamp can slide along the sides. The flat face 23 of clamp 18 provides a suitable surface for attachment of an electrical box.

A pair of slanted projections 24 jut from the surface 25 of gripping member 10 to contact clamp 18 thereby limiting the motion of the clamp along the longitudinal axis of the gripping member. The clamp 18 can be moved easily only in the direction the slanted projections 24 point. When the projections 24 point towards the wall which is to be applied to the metal stud 26, the box is prevented from moving backward when dry wall is applied to the metal stud.

An assembled device of the invention is shown in FIG. 4. A metal I-beam 26 having flanges 28 connected by a web 27 has the gripping means 12 of the gripping member 10 attached thereto. Each of the gripping means 12 comprises two projections spaced apart by a thickness about equal to the thickness of the flanges 28 so the projections firmly grip the flanges. As shown the gripping means 12 firmly grip a portion of each flange located on the same side of the web. Detent 15 on gripping means 12 projects into a channel 25 formed as an integral part of the flanges 28. The detent preventing motion of the gripping member 10 along the longitudinal axis of the beam 26.

The clamp 18 has been placed with the hooks 20 holding the clamp on the gripping member 10, the slanted projections 24 contacting the clamp 18.

An electrical outlet box 30 is attached to the clamp 18. The clamp 18 and the electrical outlet box can be of plastic material and could be joined by means of ultrasonic or solvent welding as well as by the threaded means shown.

The clamp 18 with the outlet box 30 attached can be moved a sufficient amount to bring the face 32 of the box in alignment with the face of the plasterboard to be attached to the metal stud. Where necessary the box can be moved into approximately the right position and after the dry wall is in place the box is moved slightly forward into final alignment. If the outlet box 30 is too far forward with respect to the dry wall, the clamp 18 can be moved completely off the gripping member 10 and reattached from the rear. This allows the outlet box to be repositioned.

In FIG. 5 a mounting device having a different embodiment of a gripping member 33 is shown. Gripping member 33 is formed in an L-shaped configuration and has gripping means 34 which are adapted to grasp both ends of a single flange 28. An arm 36 extends from the gripping means parallel to the web 27 and perpendicular to the face of the flange. The gripping means 34 are spaced apart about the width of the face of the flange 28 and a detent engages one of the channels 25 on I-beam 26. The gripping member 33 functions in the same manner as the gripping member 18 shown in FIG. 4.

It is noted that the arrangement illustrated in FIG. 4 may be preferable as the gripping member 18 will provide additional rigidity to the I-beam-mounting device junction.

Various modifications and alterations will become apparent to those skilled in the art without departing from the scope and spirit of this invention and is to be understood that this invention is not limited to the two illustrative embodiments described herein.

What is claimed is:

1. A mounting device for use in attaching an electrical box to a metal stud having at least one flange having two flange ends and a web in a spaced configuration comprising:
   a gripping member having at least one end formed into a gripping means, the gripping means being adapted to grip the two flange ends of said flange;
   a clamp having hooks thereon, mounted on the gripping member the hooks engaging the gripping member so as to allow motion of the clamp along the longitudinal axis of the gripping member;
   means associated with the gripping member to limit motion of the clamp along the longitudinal axis of the metal stud, said means preventing motion of the clamp in one direction along the longitudinal axis of the gripping member and allowing infinitely variable motion of the clamp in the other direction along the longitudinal axis of the gripping member, the means including at least one projection projecting from the gripping member at an angle thereto so as to contact a portion of the clamp; and
   means for securing an electrical outlet box to the clamp, the resulting mounting device allowing movement of the clamp and attached electrical box to position the box relative to dry wall attached to the metal stud.

2. The device of claim 1 wherein the gripping means includes a stop for engagement with the clamp to selectively limit movement of the clamp in said other direction.

3. A device of claim 2 where the metal stud has an I-beam configuration comprising a web with flanges having opposed faces there being one flange at each end of the web, the gripping member having a gripping means at each end which contacts the opposing faces of the flanges the gripping means consisting of two projection spaced apart by a distance about equal to the thickness of the flange so that the projections firmly grip a portion of the flanges the portion of each flange gripped being on the same side of the web.

4. A device of claim 3 where the flanges have a channel formed on one of the faces and at least one of the projections has a detent which projects and engages the channel to prevent motion of the gripping member along the longitudinal axis of the beam.

5. A device of claim 2 where the gripping member has gripping means which are adapted to grasp both the ends of a single flange and an arm which extends from the gripping means parallel to the web with its longitudinal axis perpendicular to the face of the flange.

6. A device of claim 5 where the gripping means comprise fingers spaced apart about the width of the face of the flange and at least one detent on the fingers which engages a channel on the flange thereby preventing motion of the gripping member parallel to the longitudinal axis of the beam.

7. A mounting device for use in attaching an electrical box to a metal stud having an I-beam configuration comprising a web with flanges having opposed faces, there being one flange at each end of the web, the flanges each having a channel formed on one of the faces, said device comprising:
   a gripping member having a gripping means at each end which contacts the opposing faces of the flanges the gripping means consisting of two projections spaced apart by a distance about equal to the thickness of the flange so that the projections firmly grip a portion of the flanges, the portion of each flange gripped being on the same side of the web, at least one of the projections having a detent which projects into and engages the channel to prevent motion of the gripping member along the longitudinal axis of the beam;

a clamp having hooks thereon, mounted on the gripping member the hooks engaging the gripping member so as to allow motion of the clamp along the longitudinal axis of the gripping member;

means associated with the gripping member to limit motion of the clamp along the longitudinal axis of the metal stud, said means preventing motion of the clamp in one direction along the longitudinal axis of the gripping member and allowing infinitely variable motion in the other direction along the longitudinal axis of the gripping member, the means including at least one projection projecting from the gripping member at an angle thereto so as to contact a portion of the clamp;

the gripping means including a stop for engagement with the clamp to selectively limit movement of the clamp in said other direction; and means for securing an electrical outlet box to the clamp, the resulting mounting device allowing movement of the clamp and attached electrical box to position the box relative to dry wall attached to the metal stud.

* * * * *